(12) United States Patent
Kim

(10) Patent No.: US 9,071,784 B2
(45) Date of Patent: Jun. 30, 2015

(54) IMAGE FORMING APPARATUS, PRINTING CONTROL TERMINAL APPARATUS, AND IMAGE FORMING METHOD THEREOF

(75) Inventor: Young-mi Kim, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 36 days.

(21) Appl. No.: 13/539,847

(22) Filed: Jul. 2, 2012

(65) Prior Publication Data

US 2013/0021626 A1    Jan. 24, 2013

(30) Foreign Application Priority Data

Jul. 20, 2011    (KR) ........................ 10-2011-0072045

(51) Int. Cl.
*H04N 1/40* (2006.01)
*H04N 1/38* (2006.01)
*H04N 1/62* (2006.01)
*G06K 9/00* (2006.01)

(52) U.S. Cl.
CPC ................. *H04N 1/38* (2013.01); *H04N 1/622* (2013.01); *G06K 9/00449* (2013.01)

(58) Field of Classification Search
CPC ............ H04N 1/40012; H04N 9/7921; H04N 9/8042; H04N 1/40093; H04N 1/60; H04N 1/6027; H04N 1/32309

USPC ........... 358/2.1, 1.9, 464–466, 468, 463, 448, 358/1.16, 1.18

See application file for complete search history.

(56) References Cited

U.S. PATENT DOCUMENTS

| 5,202,934 A * | 4/1993 | Miyakawa et al. ........... 382/319 |
| 6,665,096 B1 * | 12/2003 | Oh ................................. 358/461 |
| 7,821,688 B2 * | 10/2010 | Nishioka ....................... 358/518 |
| 7,860,310 B2 * | 12/2010 | Yamamoto .................... 382/173 |

FOREIGN PATENT DOCUMENTS

| CN | 102551683 A * | 7/2012 |
| EP | 1826720 A1 * | 8/2007 |

* cited by examiner

*Primary Examiner* — Thomas D Lee
*Assistant Examiner* — Stephen M Brinich
(74) *Attorney, Agent, or Firm* — Staas & Halsey LLP

(57) ABSTRACT

An image forming method, which includes pre-scanning a page to be scanned, displaying candidate colors that correspond to a preset condition through analysis of color components of the pre-scanned image, selecting a dropout color among the displayed candidate colors, and eliminating the selected dropout color from a main-scanned image if main scan of the page to be scanned is performed.

20 Claims, 12 Drawing Sheets

FIG. 3C
06
100,Teheran-ro
 Gannam-gu Seoul
Date 10-04-10 13:46
 Recipient : 70663001 A:02
Parking free

FIG. 4

Number:591052000
Business type
Trade Business code
D7163

Name of Firm
Samsung ELECTRONICS CO. LTD

Adress
416 MAETAN 3-DONG YEONGTONG-
SUWON-SI
GYEONGGI-DO, KOREA

Business Registory number
82-31-260-00

Name of Rep.
Min-Gu Han

Recipient Address
1600-1, A-ro, B city C country

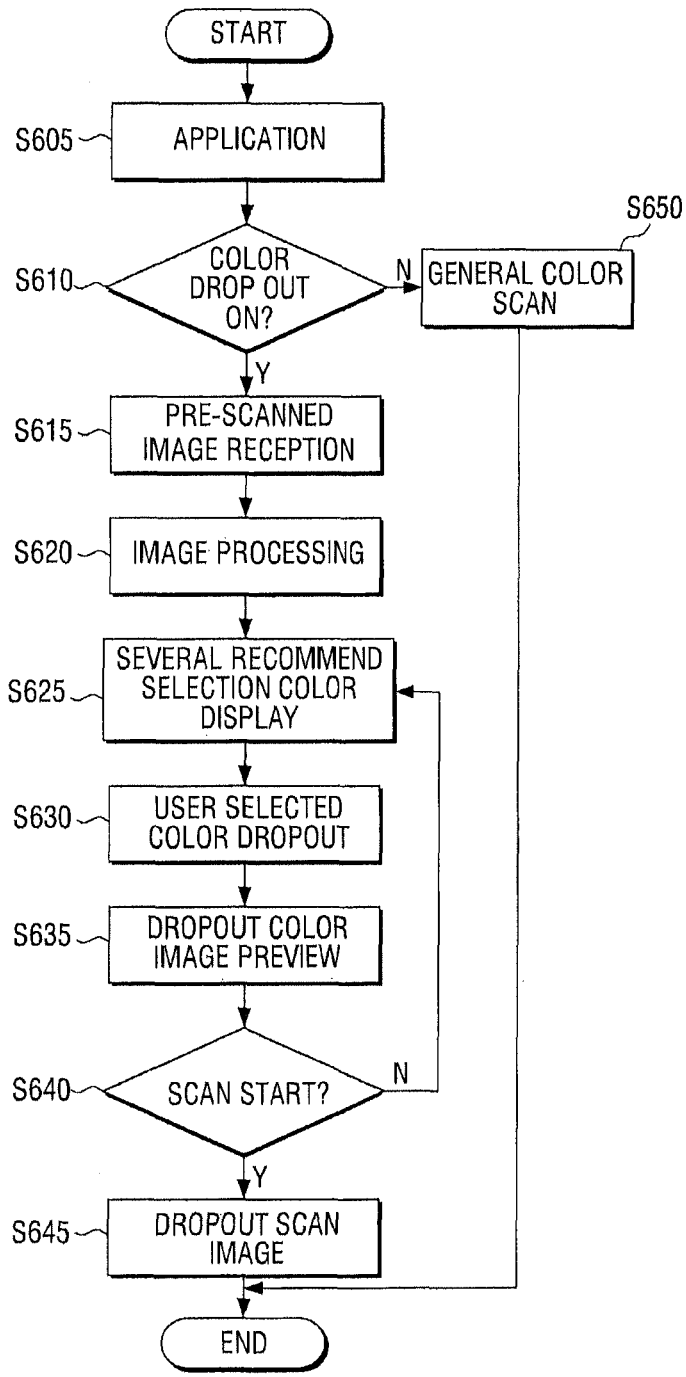

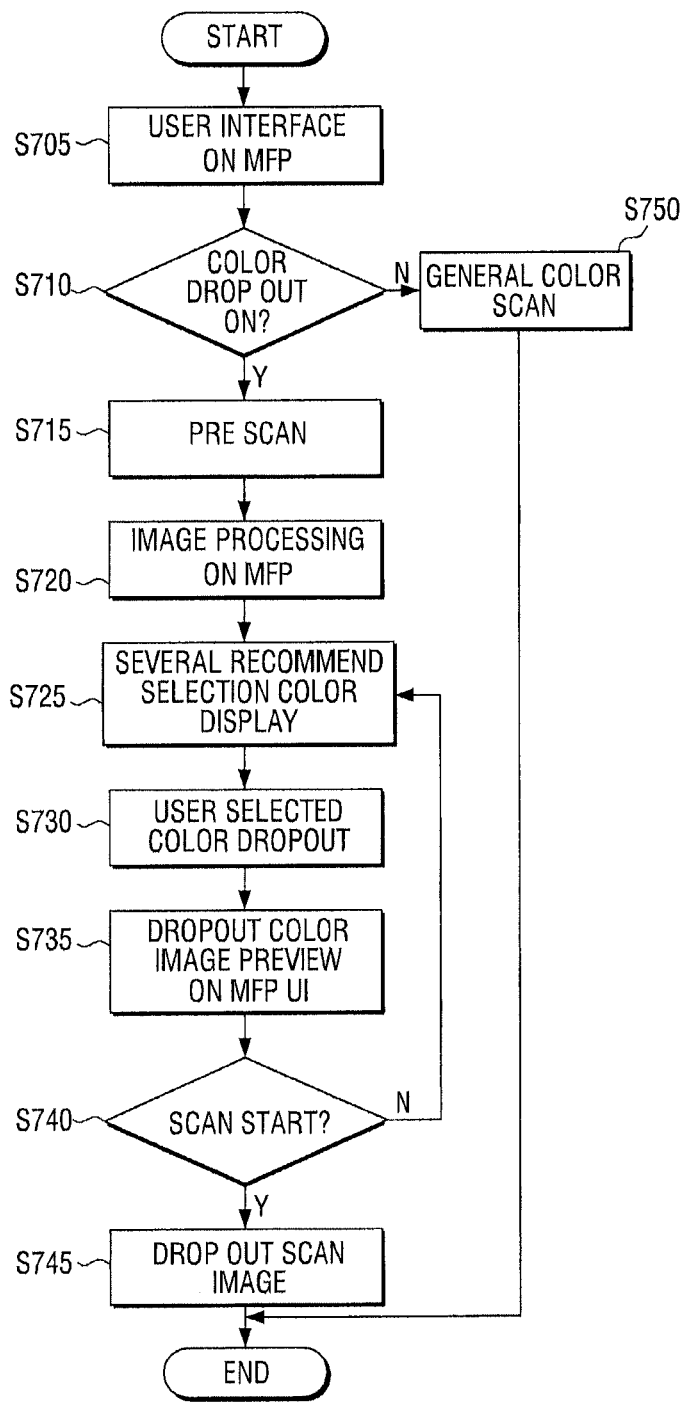

IMAGE FORMING APPARATUS, PRINTING CONTROL TERMINAL APPARATUS, AND IMAGE FORMING METHOD THEREOF

CROSS-REFERENCE TO RELATED APPLICATIONS

This application claims the priority benefit, under 35 U.S.C. §119(a), of Korean Patent Application No. 10-2011-0072045, filed on Jul. 20, 2011, in the Korean Intellectual Property Office, the disclosure of which is incorporated herein by reference.

BACKGROUND

1. Field

Example embodiments of the following description relate to an image forming apparatus, a printing control terminal apparatus, and an image forming method thereof, and more particularly, to an image forming apparatus, a printing control terminal apparatus, and an image forming method thereof, which can perform color dropout.

2. Description of the Related Art

In order to acquire only necessary information in a document processing system, which scans and stores documents having a form of a table type, or which processes information additionally input to a form document, it is desirable to eliminate a table style existing in the form document or a background having a specified color. Such requirements have been gradually increased in business environments, in which a large number of form documents are used, such as insurances, banks, or government and public offices.

In general, a method of eliminating designated colors from a color-scanned image may include a method using optical filters and a method using digital image processing. The method of implementing dropout using optical filters of sensors has the drawback in that it is difficult to adjust the optical filter parameters of the optical filters to match nonstandard colors and the optical filters cannot be used with multiple-color dropout. Accordingly, various digital processing methods for performing pixel-unit processes with a color space converted or maintained as it is have been devised.

If one color is simply designated and eliminated when a document form is removed using the above-described dropout methods in the related art, important information having a color that is similar to the color of the form may also be removed. In order to improve this, a process for enabling a user to select dropout colors, among colors included in an image and to select color dropout sensitivities as in Equation (1) below has been devised.

$$\text{Grayscale}_1 = 0.299 * \text{Red} + 0.587 * \text{Green} + 0.114 * \text{Blue}$$

$$\text{Grayscale}_2 = 0.333 * \text{Red} + 0.333 * \text{Green} + 0.333 * \text{Blue}$$

$$\text{Dropout}_{Red} = 1 * \text{Red} + 0 * \text{Green} + 0 * \text{Blue}$$

$$\text{Dropout}_{Green} = 0 * \text{Red} + 1 * \text{Green} + 0 * \text{Blue}$$

$$\text{Dropout}_{Blue} = 0 * \text{Red} + 0 * \text{Green} + 1 * \text{Blue} \quad (1)$$

However, this process also has a problem in that the selection of the color dropout sensitivity of the scanned image is not performed through reflection of the scanner characteristics, and thus, the colors that constitute the document form cannot be accurately eliminated.

Further, a method for removing values of other channels that do not correspond to the primary colors through adjustment of weight values of respective channels, as in Equation (2) below, has been devised.

$$\text{Dropout}_{Magenta} = 0.5 * \text{Red} + 0 * \text{Green} + 0.5 * \text{Blue}$$

$$\text{Dropout}_{Cyan} = 0 * \text{Red} + 0.5 * \text{Green} + 0.5 * \text{Blue}$$

$$\text{Dropout}_{Yellow} = 0.5 * \text{Red} + 0.5 * \text{Green} + 0 * \text{Blue} \quad (2)$$

Although the color dropout through the above-described weight values by colors achieves good performance in eliminating unmixed colors of RGB or secondary colors through combinations of RGB, there is a problem in the color dropout performance due to the fact that colors expressed on a general manuscript are diverse colors which are not divided into unmixed colors of RGB and secondary colors through combinations of RGB. Further, another problem is due to the fact that the range or sensitivity of the colors to be eliminated cannot be adjusted.

In order to solve these problems, a process for eliminating color by enabling a user to select a specified color and its sensitivity has been proposed as a process for solving the problems.

However, it is troublesome for a user to select the dropout color. Further, if a user selects a place that is not the form by mistake due to, for example, a complicated form or thin lines, or if the selection of the color sensitivity is not correct, even though a desired color has been selected, the color dropout with an accuracy desired by the user cannot be performed.

SUMMARY

Additional aspects and/or advantages will be set forth in part in the description which follows and, in part, will be apparent from the description, or may be learned by practice of the disclosure.

The present disclosure has been made to address at least the above problems and/or disadvantages and to provide at least the advantages described below. Accordingly, an aspect of the present disclosure provides an image forming apparatus, a printing control terminal apparatus, and an image forming method thereof, which can recommend a user for a color to be eliminated through analysis of an image.

According to one aspect of the present disclosure, an image forming method includes pre-scanning a page to be scanned; displaying candidate colors that correspond to a preset condition through analysis of color components of the pre-scanned image; selecting a dropout color among the displayed candidate colors; and eliminating the selected color from a main-scanned image if main scan of the page to be scanned is performed.

In this case, the preset condition may be a condition that is set to determine the color components of lines of a form that constitutes the pre-scanned image as the candidate colors.

The displaying of the candidate colors may include searching for the lines having a length that is equal to or larger than a preset length, among the respective components of the form that constitutes the pre-scanned image; detecting color components of pixels that constitute the searched lines; and displaying the detected color components as the candidate colors.

Further, the displaying of the candidate colors may include searching for the lines having a length that is equal to or larger than a preset length among the respective components of the form that constitutes the pre-scanned image; detecting color components of pixels that constitute the searched lines; converting the detected color components into values on a preset color space; sampling plural color values of the pixels distributed in the color space, and classifying the sampled color values into plural groups through clustering of the sampled samples by distribution areas; and determining a priority of the dropout candidate colors using at least one of a center value, a distribution number, and an object number ratio of the respective classified groups.

Here, the preset condition may be a condition that is set to determine the color components having great weight on the pre-scanned image as the candidate colors.

Further, the displaying of the candidate colors may include detecting color components of pixels that constitute at least part of areas constituting the pre-scanned image; converting the detected color components into values on a preset color space; sampling plural color values of the pixels distributed in the color space, and classifying the sampled color values into plural groups through clustering of the sampled samples by distribution areas; and determining a priority of the dropout candidate colors using at least one of a center value, a distribution number, and an object number ratio of the respective classified groups.

The image forming method according to the aspect of the disclosure may further include providing a preview function for the pre-scanned image from which the selected color has been eliminated.

According to another aspect of the present disclosure, an image forming apparatus includes an image readout unit pre-scanning a page to be scanned; an image processing unit determining candidate colors that correspond to a preset condition through analysis of color components of the pre-scanned image; a user interface unit displaying the determined candidate colors and selecting a dropout color, among the displayed candidate colors; and a control unit operating to eliminate the selected color from a main-scanned image if main scan of the page to be scanned is performed.

Here, the preset condition may be a condition that is set to determine the color components of lines of a form that constitutes the pre-scanned image as the candidate colors.

The image processing unit may search for line components having a length that is equal to or larger than a preset length, among the respective components of the form that constitutes the pre-scanned image, detect color components of pixels that constitute the searched lines, and determine the detected color components as the candidate colors.

Further, the image processing unit may include a search unit searching for the lines having a length that is equal to or larger than a preset length among the respective components of the form that constitutes the pre-scanned image; a color space conversion unit detecting color components of pixels that constitute the searched lines and converting the detected color components into values on a preset color space; a classification unit sampling plural color values of the pixels distributed in the color space and classifying the sampled color values into plural groups through clustering of the sampled samples by distribution areas; and a priority determination unit determining a priority of the dropout candidate colors using at least one of a center value, a distribution number, and an object number ratio of the respective classified groups.

In this case, the preset condition may be a condition that is set to determine the color components having great weight on the pre-scanned image as the candidate colors.

Further, the image processing unit may include a color space conversion unit detecting color components of pixels that constitute at least part of areas constituting the pre-scanned image and converting the detected color components into values on a preset color space; a classification unit sampling plural color values of the pixels distributed in the color space and classifying the sampled color values into plural groups through clustering of the sampled samples by distribution areas; and a priority determination unit determining a priority of the dropout candidate colors, using at least one of a center value, a distribution number, and an object number ratio of the respective classified groups.

The user interface unit may provide a preview function for the pre-scanned image from which the selected color has been eliminated.

According to still another aspect of the present disclosure, a printing control terminal apparatus connected to an image forming apparatus includes a communication interface unit receiving a pre-scanned image from the image forming apparatus; an image processing unit determining candidate colors that correspond to a preset condition through analysis of color components of the pre-scanned image; a user interface unit displaying the determined candidate colors and selecting a dropout color among the displayed candidate colors; and a control unit operating to eliminate the selected color from a main-scanned image if main scan of the page to be scanned is performed.

Here, the preset condition may be a condition that is set to determine the color components of lines of a form that constitutes the pre-scanned image as the candidate colors.

Further, the preset condition may be a condition that is set to determine the color components having great weight on the pre-scanned image as the candidate colors.

According to still another aspect of the present disclosure, a method of controlling a printing control terminal apparatus connected to an image forming apparatus includes receiving a pre-scanned image from the image forming apparatus; displaying candidate colors that correspond to a preset condition through analysis of color components of the pre-scanned image; selecting a dropout color, among the displayed candidate colors; and eliminating the selected color from a main-scanned image if main scan of the page to be scanned is performed.

In this case, the preset condition may be a condition that is set to determine the color components of lines of a form that constitutes the pre-scanned image as the candidate colors.

Further, the preset condition may be a condition that is set to determine the color components having great weight on the pre-scanned image as the candidate colors.

Accordingly, when eliminating the form included in a document, a user can eliminate only the form to be eliminated with high accuracy.

BRIEF DESCRIPTION OF THE DRAWINGS

The above and other aspects, features and advantages of the present disclosure will be more apparent from the following detailed description when taken in conjunction with the accompanying drawings, in which:

FIGS. 3A to 3C are diagrams illustrating an image processing procedure, according to example embodiments;

FIG. 4 is a diagram illustrating an image processing procedure, according to another example embodiment;

FIG. 6 is a flowchart illustrating an image forming method, according to an example embodiment;

FIG. 7 is a flowchart illustrating an image forming method, according to another example embodiment.

DETAILED DESCRIPTION

Embodiments of the present disclosure are described in detail with reference to the accompanying drawings.

Figure 1A:
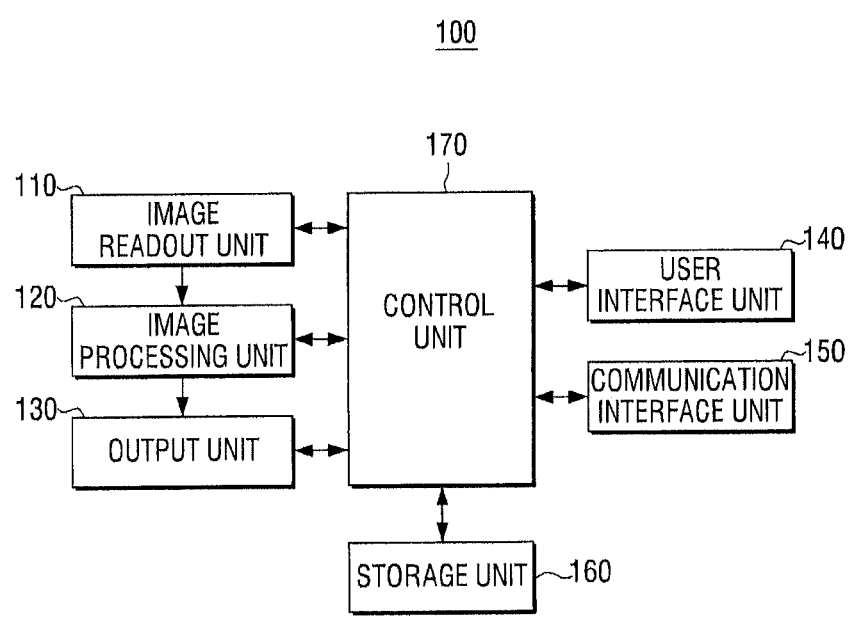
FIG. 1A is a block diagram illustrating the configuration of an image forming apparatus, according to example embodiments.

FIG. 1A is a block diagram illustrating the configuration of an image forming apparatus according to an embodiment of the present disclosure.

Referring to FIG. 1A, an image forming apparatus 100 is connectable to an external device, and functions to output document data. The image forming apparatus 100 may be implemented in diverse forms, such as a printer, a scanner, a copy machine, a facsimile, and a multifunctional peripheral that has at least two functions of the printer, scanner, copy machine, and facsimile.

The image forming apparatus 100 may adopt color dropout technology. In this case, the color dropout technology is technology of eliminating the contents that are expressed with a specified color existing on a document in the process of converting a color image into a grayscale or BW image.

The image readout unit 110 reads a page to be scanned using an image sensor.

The image readout unit 110 may perform pre-scan of the page to be scanned, and then perform main scan for generating actual scan data.

Specifically, the image readout unit 110 may be implemented by a scan module (not illustrated) that performs a scan operation.

The scan module (not illustrated) performs the scan operation under the control of a control unit 180 to be described later, and includes an image sensor unit (not illustrated), a motor unit (not illustrated), a position sensor unit (not illustrated), and a scan control unit (not illustrated).

The image sensor unit (not illustrated) includes a CIS sensor (not illustrated) for obtaining RGB pixel values that correspond to an image through sensing of the image, and transmits the RGB pixel values which are sensed from respective positions through the CIS sensor to the scan control unit (not illustrated).

The motor unit (not illustrated) transports a manuscript in a scan proceeding direction so that the RGB pixel values that correspond to the image formed on the manuscript can be sensed in a line unit.

The position sensor unit (not illustrated) senses the position of the manuscript that is put into the image forming apparatus, and delivers the manuscript to the scan control unit (not illustrated). The scan control unit (not illustrated) controls the image sensor unit (not illustrated), the motor unit (not illustrated), and the position sensor unit (not illustrated) to perform the scan operation in accordance with a scan command that is received from the control unit 180 to be described later. That is, the scan control unit (not illustrated) generates image data that corresponds to the image formed on the manuscript through combination of the RGB pixel values that are sensed through the image sensor unit (not illustrated). Description of other scan tasks will be omitted.

The image processing unit 120 may determine candidate colors that correspond to a preset condition through analysis of color components of the pre-scanned image.

Here, the preset condition may be a condition that is set to determine the color components of lines of a form that constitutes the pre-scanned image as the candidate colors.

Further, the present condition may be a condition that is set to determine the color components having great weight on the pre-scanned image as the candidate colors.

Accordingly, the image processing unit 120 may determine the dropout candidate colors by analyzing straight line components of the form that constitutes the pre-scanned image or analyzing color components having great weight on the pre-scanned image.

Further, the image processing unit 120 may process a main-scanned image so as to eliminate the selected color if at least one of the candidate colors determined in accordance with a user command is selected and main scan of the page to be scanned is performed.

The output unit 130 may output the scanned data that is processed by the image processing unit 120 under the control of the control unit 170 on a recording medium.

For example, in the case of a laser image forming apparatus, the surface of an IPC (not illustrated) is charged by a charging unit (not illustrated), and a latent image is formed on the charged area by an LSU (not illustrated). If development is performed by a development unit (not illustrated) in this state, toner is attached to the latent image, and transferred to a paper side by a transfer unit (not illustrated). The transferred toner is fused on the paper by a fusing unit (not illustrated). However, this is merely exemplary, and it is apparent to those skilled in the art that the image forming apparatus according to the disclosure can be applied to an ink jet type.

The user interface unit 140 includes operation keys (not illustrated) through which user commands for controlling the operation of the image forming apparatus and a display window (not illustrated), such as, an LCD (Liquid Crystal Display) for displaying the state of the image forming apparatus. Further, the user interface unit 140 may be implemented by a device that simultaneously perform input and output operations such as a touch pad.

Further, the user interface unit 140 may display various kinds of information provided from the image forming apparatus 100, proceedings of a job that is performed in the image forming apparatus 100, and the result of the job proceeding. The user may confirm various kinds of print jobs in the image forming apparatus 100 and control the management thereof through the user interface unit 140.

In particular, the user interface unit 140 may display the candidate colors determined by the image processing unit 120, and select a dropout color, among the displayed candidate colors. Accordingly, the control unit 170 may control the image processing unit to perform the dropout of the selected color from the main-scanned image.

A communication interface unit 150 supports data communication with an external device (not illustrated) through a network. For example, the communication interface unit 150 may be implemented in a form capable of supporting a DLNA network, a local system, a LAN (Local Area Network), and the Internet.

The storage unit 160 may be implemented by a storage medium in the image forming apparatus 100 or an external storage medium, for example, a removable disk including a USB memory, a storage medium connected to a host, a web server through a network, or the like.

The control unit 170 controls the operations of the respective constituent elements of the image forming apparatus 100. Specifically, if a scan command is received through the user interface unit 150, the control unit 170 receives the scan command through the user interface unit 150, and controls the image readout unit 110 to perform the scan operation.

Further, if at least one color among the dropout candidate colors determined by the image processing unit 120 is selected, the control unit 170 controls the image processing unit 120 to perform the dropout of the selected color from the main-scanned image.

The control unit 170 controls the operations of the respective constituent elements of the image forming apparatus 100 in accordance with the various kinds of pre-stored programs. Specifically, the control unit 170 receives the scan command through the user interface unit 150, and controls the image readout unit 120 to perform the scan operation.

On the other hand, although it is exemplified in this embodiment that the dropout color processing tasks are controlled through the constituent elements provided in the image forming apparatus 100, this is merely exemplary, and all of the above-described functions may be controlled through a printer driver (not illustrated) or an application (not illustrated) provided in the host device (not illustrated). This will be described with reference to FIG. 2.

Figure 1B:
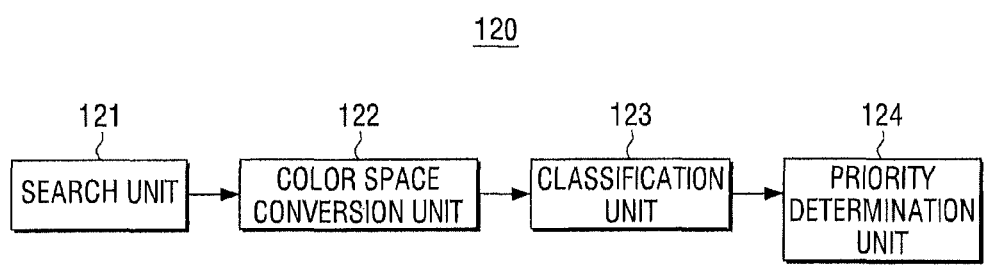
FIG. 1B is a block diagram illustrating the detailed configuration of an image processing unit, according to example embodiments.

FIG. 1B is a block diagram illustrating the detailed configuration of an image processing unit 120, according to an embodiment of the present disclosure.

Referring to FIG. 1B, the image processing unit 120 includes a search unit 121, a color space conversion unit 122, a classification unit 123, and a priority determination unit 124.

As described above, the image processing unit 120 may determine the dropout candidate colors by analyzing straight line components of the form that constitutes the pre-scanned image or analyzing the color components having great weight on the pre-scanned image. Hereinafter, two example embodiments thereof will be described.

In the Case of Analyzing the Straight Line Components of the Form

In this example embodiment, the search unit 121 searches for lines having a length that is equal to or larger than a preset length, among the respective components of the form that constitutes the pre-scanned image.

The color space conversion unit 122 detects the color components of the pixels that constitute the lines searched by the search unit 121, and converts the detected color components into values on the preset color space.

The classification unit 123 performs sampling of plural color values of the pixels distributed in the color space and classifies the sampled color values into plural groups through clustering of the sampled samples by distribution areas.

The priority determination unit 124 determines the priority of the dropout candidate colors using at least one of a center value, a distribution number, and an object number ratio of the respective classified groups.

In the Case of Analyzing Color Components Having Great Weight

In this example embodiment, the color space conversion unit 122 detects the color components of the pixels that constitute at least part of the areas constituting the pre-scanned image and converts the detected color components into values on the preset color space.

The classification unit 123 performs sampling of plural color values of the pixels distributed in the color space, and classifies the sampled color values into plural groups through clustering of the sampled samples by distribution areas.

The priority determination unit 124 determines the priority of the dropout candidate colors using at least one of the center value, the distribution number, and the object number ratio of the respective classified groups.

Accordingly, the user interface unit 140 can display the candidate colors in accordance with the priority determined by the priority determination unit 124.

Figure 2:
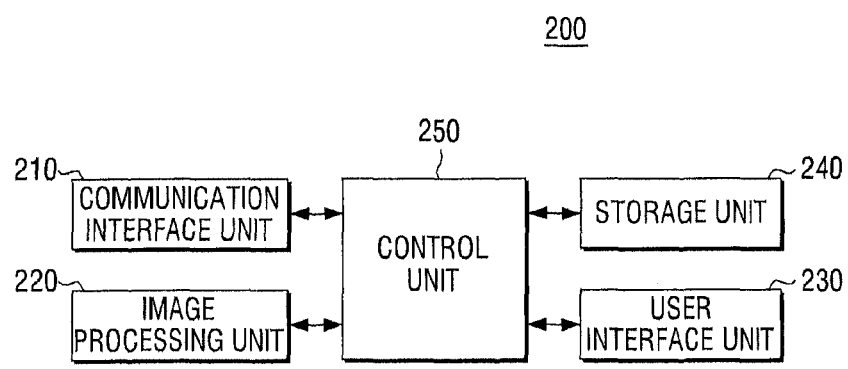
FIG. 2 is a block diagram illustrating the configuration of a printing control terminal apparatus, according to example embodiments.

FIG. 2 is a block diagram illustrating the configuration of a printing control terminal apparatus according to an example embodiment of the present disclosure.

The printing control terminal apparatus 200 illustrated in FIG. 2 supports a resource saving mode, and is connected to the image forming apparatus that outputs document data. The printing control terminal apparatus 200 may include a personal computer, a notebook computer, a PDA, a PMP, and a portable phone.

The communication interface unit 210 is connected to at least one image forming apparatus, and provides converted print data for the print job (converted document data and selected output option information) to the image forming apparatus. Specifically, the communication interface unit 210 is provided to connect the printing control terminal apparatus 100, and may include a parallel port, a USB (Universal Serial Bus) port, and a wireless module.

The communication interface unit 210 may receive the pre-scanned image of the page to be scanned that is transmitted from the image forming apparatus.

The image processing unit 220 may determine the candidate colors that correspond to the preset condition by analyzing the color components of the pre-scanned image that is received through the communication interface unit 210.

Here, the preset condition may be a condition that is set to determine the color components of the lines of the form that constitutes the pre-scanned image as the candidate colors.

Further, the present condition may be a condition that is set to determine the color components having great weight on the pre-scanned image as the candidate colors.

Accordingly, the image processing unit 220 may determine the dropout candidate colors by analyzing straight line components of the form that constitutes the pre-scanned image or analyzing the color components having great weight on the pre-scanned image.

Further, if at least one of the candidate colors determined in accordance with the user command is selected and the main-scanned image of the page to be scanned is received through the communication interface unit 210, the image processing unit 220 may process the main-scanned image so as to eliminate the selected color on the received main-scanned image.

On the other hand, the function of the image processing unit 220 may be implemented to be performed by a printer driver. The printer driver may include at least one driver that corresponds to at least one language, and performs a print job with respect to the image forming apparatus that operates with the corresponding language. Specifically, in the case where the user intends to print a document that is prepared by an application program, the printer driver may generate the print data in a print language form that is recognizable to the image forming apparatus of which the user intends to perform the print job.

The user interface unit 230 includes many operation keys through which a user can set or select various kinds of functions supported by the printing control terminal apparatus 200, and may be implemented by a device that simultaneously performs input and output operations, such as, a touch pad or a mouse. A user can select the document data to be outputted through the image forming apparatus that is connected through the communication interface unit 210 and an output option to be applied to the selected document data through the user interface unit 230.

Further, the user interface unit 230 displays various kinds of information provided from the printing control terminal apparatus 200.

Further, the user interface unit 230 may display the candidate colors determined by the image processing unit 220, and select the dropout color, among the displayed candidate colors. Accordingly, the control unit 250 may control the image processing unit 220 to perform the dropout of the selected color from the main-scanned image.

Since the objects that are displayed on the user interface unit 230 and the display type are the same as those that are displayed on the display unit of the image forming apparatus 100 as illustrated in FIG. 1, the detailed description thereof will be omitted.

The storage unit 240 may store image forming apparatus information that is received from the communication interface unit 210. Further, the storage unit 240 may temporarily store the print data generated by the above-described printer driver, and pre-store a scripter in which print options supported by models of the image forming apparatus and supported print language information are stored.

The control unit 250 controls the operations of the respective constituent elements of the printing control terminal apparatus 200 in accordance with the various kinds of pre-stored programs.

The control unit 250 controls the constituent elements that are required to perform the print job in accordance with the output option selected by the image forming apparatus using the printer driver.

Further, the control unit 250 may receive the scan command through the user interface unit 220, and transmit a command for controlling the scan unit 120 (see FIG. 1) to perform the scan operation to the image forming apparatus.

On the other hand, the detailed configuration of the image processing unit 220 is the same as that illustrated in FIG. 1B, separate description thereof will be omitted.

Further, since it is apparent to those skilled in the art that the printing control terminal apparatus, according to this example embodiment, can perform the functions that are applied to the image forming apparatus 100, as illustrated in FIG. 1, within the limit of possible image forming jobs using the printer driver, the detailed description thereof will be omitted.

Figure 3A:
Figure 3B:
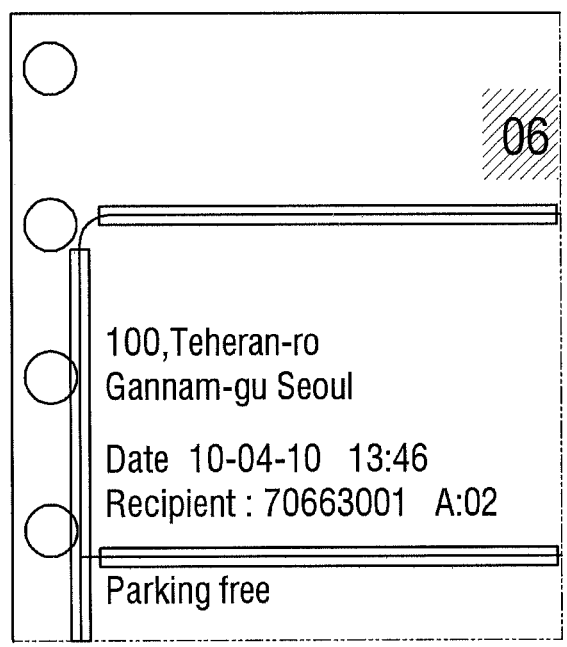

FIGS. 3A to 3C are diagrams illustrating an image processing procedure, according to an example embodiment of the present disclosure.

As illustrated in FIG. 3A, since the form included in the document is mainly composed of relatively long straight lines, the form that corresponds to the straight line components on the pre-scanned image, as illustrated in FIG. 3B, is detected, and the color information of the detected straight line components is analyzed.

Then, through grouping of the color components that constitute the extracted straight lines, the center color value and the distribution are calculated, and the color of which the dropout is recommended through the user interface units 140 and 230 and the sensitivity value are presented.

Accordingly, if the color that corresponds to the straight line components is eliminated, the scanned image, as illustrated in FIG. 3C, can be acquired.

FIG. 4 is a diagram illustrating an image processing procedure, according to another example embodiment of the present disclosure.

As illustrated in FIG. 4, a color having great weight, that is, a dominant color, can be detected by analyzing the color components of the pre-scanned image. That is, most form documents (layout documents) are mainly composed of a color that is different from the color form or a mono text, and thus, the form color can be detected by analyzing the dominant color in the document. Accordingly, the color of which the dropout is recommended and the sensitivity value can be presented through the user interface units 140 and 230.

Figure 5A:
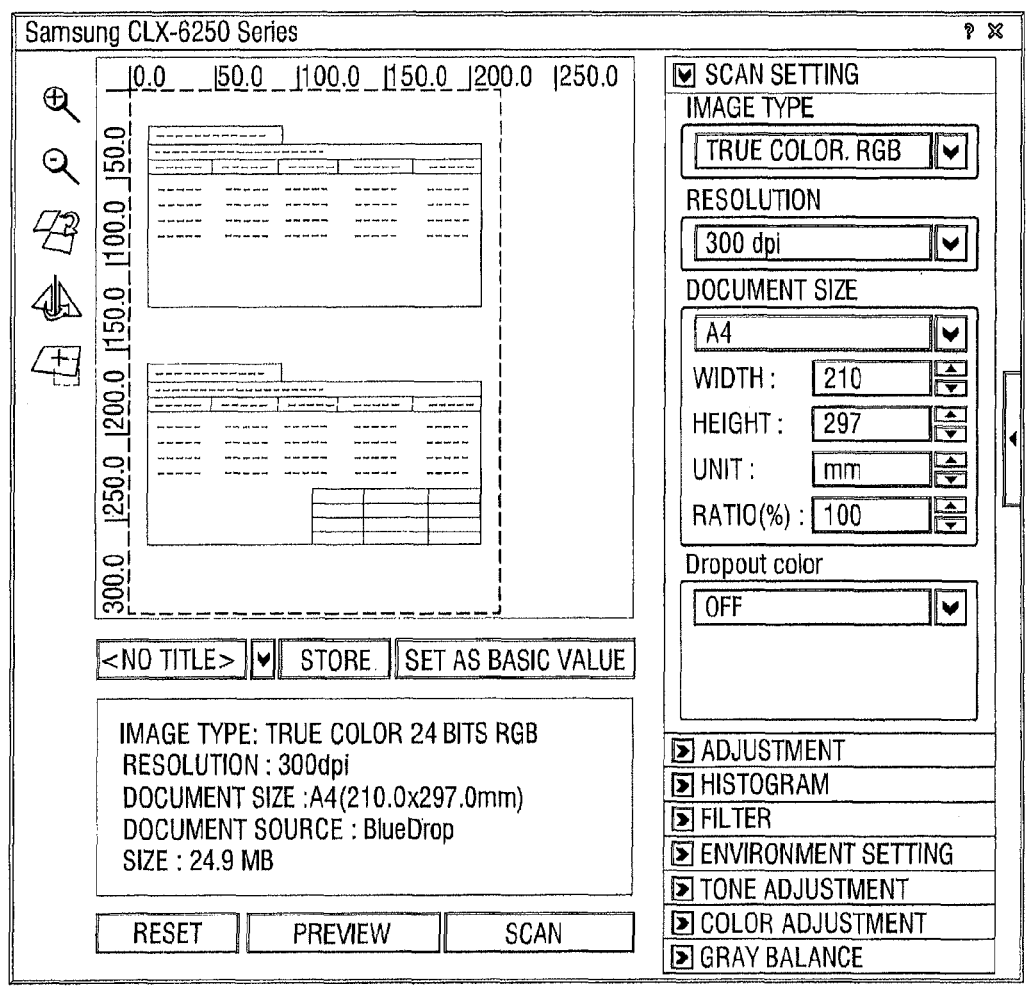
FIGS. 5A and 5B are diagrams illustrating the configuration of a user interface unit, according to example an embodiment.
Figure 5B:
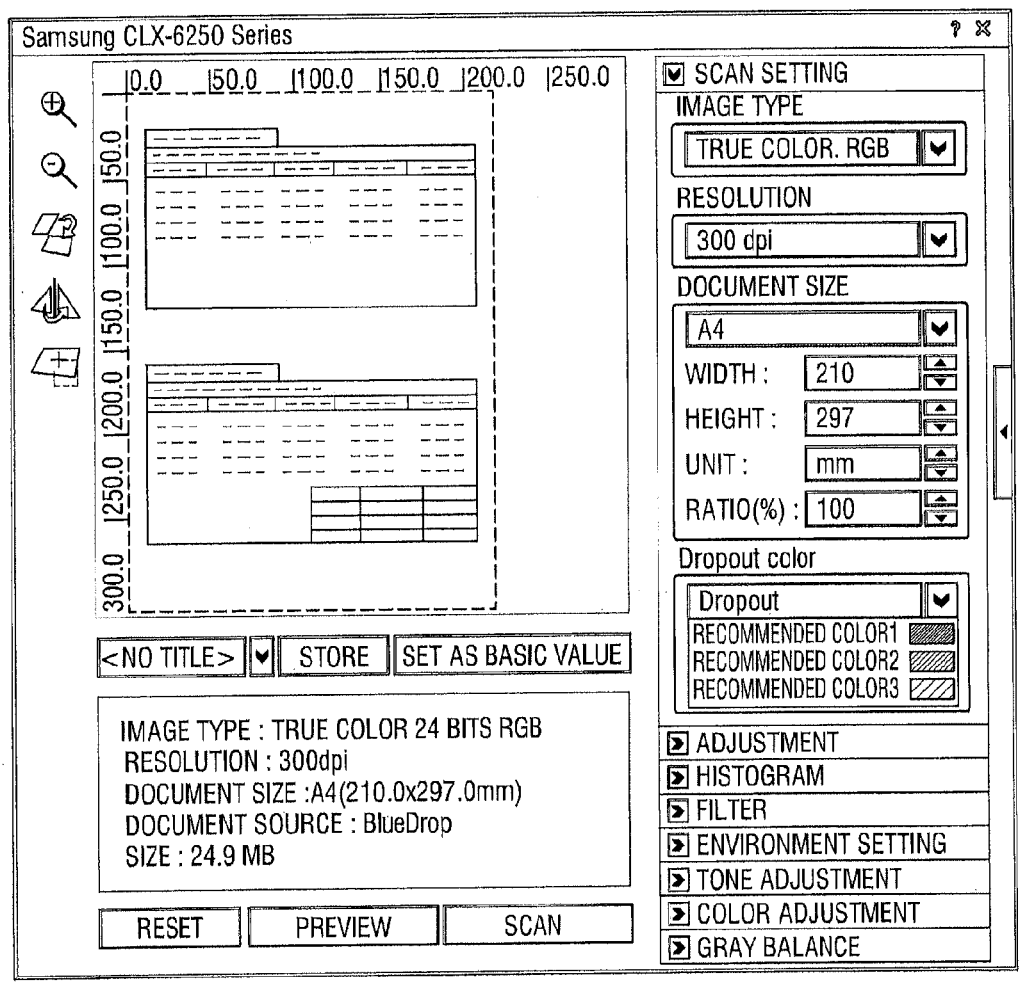

FIGS. 5A and 5B are diagrams illustrating the configuration of a user interface unit, according to an example embodiment of the present disclosure.

In the scan task, if an application is executed and the color dropout function is selected, a layout dropout (or form dropout) on/off function is activated in the UI.

As illustrated in FIG. 5A, if the dropout color off is selected, the scanned image can be generated to follow a typical scan flow.

Further, if the dropout color on is selected, as illustrated in FIG. 5B, the pre-scan of the page to be scanned, as described above is performed, and after the analysis of the color components, the analyzed form (or layout) color components may be displayed as a recommended color.

Further, one or two or more colors among the recommended colors can be selected and eliminated, and the sensitivity of the selected colors may be reflected.

Further, if a user selects the dropout color components and the sensitivity, a preview function of the result of the dropout may be provided. Accordingly, if the user repeats the dropout process through the preview, a desired scanned image can be obtained.

FIG. 6 is a flowchart illustrating an image forming method, according to an example embodiment of the present disclosure.

An image forming method in a printing control terminal apparatus, that is, a host device, will be described with reference to FIG. 6.

Referring to FIG. 6, in the printing control terminal apparatus, an application (S605) may be executed to turn on/off a color dropout job through the user interface.

If the color dropout on is selected ("Y" in S610), the image forming apparatus is controlled to perform the pre-scan of the page to be scanned, and the pre-scanned image is received from the image forming device (S615).

Then, the dropout candidate colors are determined through analysis of the color components of the pre-scanned image (S620).

A UI for recommending the candidate color determined in S620 is provided (S625).

Then, if at least one color among the recommended candidate colors is selected (S630), a preview function of the image from which the corresponding color has been eliminated is provided (S635).

Thereafter, if the scan starts in accordance with the main scan command (S640), a scanned image from which the selected color has been eliminated is generated (S645).

If the color dropout off is selected ("N" in S610), a typical color scan task may be performed (S650).

On the other hand, the above-described task may be performed by a twain driver of the printing control terminal apparatus.

FIG. 7 is a flowchart illustrating an image forming method, according to another example embodiment of the present disclosure.

An image forming method in an image forming apparatus will be described with reference to FIG. 7.

Referring to FIG. 7, in the image forming apparatus, for example, in the user interface of an MFP (S705), a color dropout function can be turned on/off (S710).

If the color dropout on is selected ("Y" in S710), the pre-scan of the page to be scanned is performed (S715).

Then, the dropout candidate colors are determined through analysis of the color components of the pre-scanned image (S720).

A UI for recommending the candidate color determined in S720 is provided (S725).

Then, if at least one color among the recommended candidate colors is selected (S730), a preview function of the image from which the corresponding color has been eliminated is provided on the user interface of the MFP (S735).

Thereafter, if the scan starts in accordance with the main scan command (S740), a scanned image from which the selected color has been eliminated is generated (S745).

If the color dropout off is selected ("N" in S710), a typical color scan task may be performed (S750).

Figure 8:
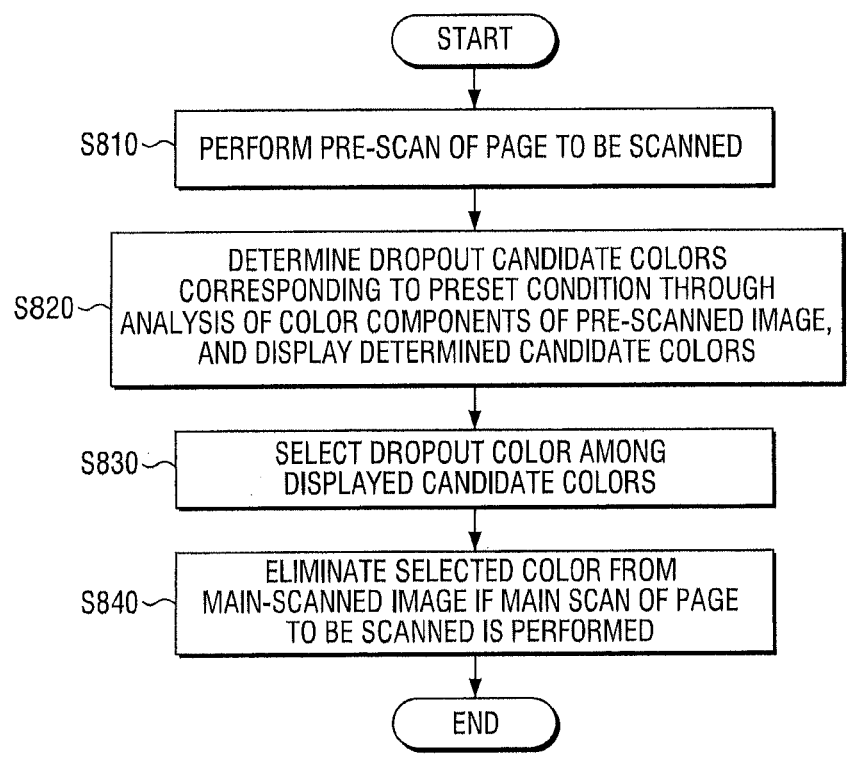
FIG. 8 is a flowchart illustrating an image forming method in an image forming apparatus, according to an example embodiment.

FIG. 8 is a flowchart illustrating an image forming method in an image forming apparatus, according to an example embodiment of the present disclosure.

According to the image forming method illustrated in FIG. 8, if a dropout function is selected, the page to be scanned is pre-scanned (S810).

Then, the dropout candidate colors that correspond to the preset condition is determined through analysis of the color components of the image pre-scanned in S810, and the determined candidate colors are displayed (S820).

Then, the dropout color among the candidate colors displayed in S820 is selected (S830).

Thereafter, if the main scan of the page to be scanned is performed, the selected color is eliminated from the main-scanned image (S840).

Further, in S820 for determining the candidate colors, the candidate colors may be determined through analysis of the straight line components of the form that constitutes the pre-scanned image.

Specifically, the straight line components having a length that is equal to or larger than the preset length among the respective components of the form that constitutes the pre-scanned image are searched for, and the color values of the pixels that constitute the searched straight line components are converted into a separate color space.

Then, the color values of the pixels are classified into plural groups through clustering of the plural samples distributed in the color space, and the priority of the dropout colors is determined using at least one of the center value, the distribution number, and the object number ratio of the classified groups to recommend the dropout color.

Further, in S820 for determining the candidate colors, the candidate colors may be determined through analysis of the color components having great weight on the pre-scanned image.

Specifically, the color values of the respective pixels in at least part of the areas that constitute the pre-scanned image are converted into the separate color space, and the color values of the pixels are classified into plural groups through clustering of the plural samples distributed in the converted color space.

Then, the priority of the dropout colors is determined using at least one of the center value, the distribution number, and the object number ratio of the classified groups to recommend the dropout color.

On the other hand, since the image forming method, according to an example embodiment of the present disclosure, which is performed in the printing control terminal apparatus is the same as the image forming method that is performed in the image forming apparatus, as illustrated in FIG. 8, except that the pre-scan and the main scan are performed in the image forming apparatus and the corresponding scanned image is received and processed in the printing control terminal apparatus, the detailed description thereof will be omitted.

Although it is exemplified that the form is removed in the above-described embodiments, this is merely exemplary, and it will be apparent to those skilled in the art that the present disclosure can be applied to other purposes, such as, the color dropout.

Accordingly, in the case of removing the form that is included in the document, only the form that the user intends to remove can be removed with high accuracy.

Further, the preview function of the result of the dropout for removing the color selected by the user from the pre-scanned image is provided to increase the user convenience and the accuracy of color dropout.

On the other hand, according to the present disclosure, a storage medium that includes a program for executing the image forming method, according to an example embodiment of the present disclosure, that is, a computer-readable recording medium, may be included. The computer readable recording medium includes all kinds of recording devices in which data that can be read by a computer system are stored. Examples of the computer readable recording medium may include a ROM, RAM, CD-ROM, magnetic tape, floppy disk, and optical data storage device. The computer readable recording medium may be distributed in the computer system connected through a network, and codes that the computer can read in a distribution method can be stored and executed. Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

Moreover, the image forming apparatus 100, as shown in FIG. 1, for example, may include at least one processor to execute at least one of the above-described units and methods.

Further, according to an aspect of the embodiments, any combinations of the described features, functions and/or operations can be provided.

While the present disclosure has been shown and described with reference to certain embodiments thereof, it will be understood by those skilled in the art that various changes in form and detail may be made therein without departing from the spirit and scope of the present disclosure, as defined by the appended claims.

What is claimed is:

1. An image forming method, comprising:
   pre-scanning, by a processor, a page to be scanned;
   analyzing color components of the pre-scanned image with respect to a preset condition to determine candidate colors corresponding the preset condition from among the color components;
   displaying the determined candidate colors;
   receiving a user input to select a dropout color, among the displayed candidate colors; and
   eliminating the selected dropout color from a main-scanned image if main scan of the page to be scanned is performed.

2. The image forming method as claimed in claim 1, further comprising providing a preview function for the pre-scanned image from which the selected color has been eliminated.

3. An image forming method, comprising:
   pre-scanning, by a processor, a page to be scanned;
   displaying candidate colors that correspond to a preset condition, from among color components of the pre-scanned image, through analysis of the color components of the pre-scanned image;
   selecting a dropout color, among the displayed candidate colors; and
   eliminating the selected dropout color from a main-scanned image if main scan of the page to be scanned is performed, wherein the preset condition is a condition that is set to determine the color components of lines of a form that constitutes the pre-scanned image as the candidate colors.

4. The image forming method as claimed in claim 3, wherein the displaying of the candidate colors comprises:
    searching for the lines having a length that is equal to or larger than a preset length, among the respective components of the form that constitutes the pre-scanned image;
    detecting color components of pixels that constitute the searched lines; and
    displaying the detected color components as the candidate colors.

5. The image forming method as claimed in claim 3, wherein the displaying of the candidate colors comprises:
    searching for the lines having a length that is equal to or larger than a preset length among the respective components of the form that constitutes the pre-scanned image;
    detecting color components of pixels that constitute the searched lines;
    converting the detected color components into values on a preset color space;
    sampling plural color values of the pixels distributed in the color space, and classifying the sampled color values into plural groups through clustering of the sampled samples by distribution areas; and
    determining a priority of the dropout candidate colors using at least one of a center value, a distribution number, and an object number ratio of the respective classified groups.

6. An image forming method, comprising:
    pre-scanning, by a processor, a page to be scanned;
    displaying candidate colors that correspond to a preset condition, from among color components of the pre-scanned image, through analysis of the color components of the pre-scanned image;
    selecting a dropout color, among the displayed candidate colors; and
    eliminating the selected dropout color from a main-scanned image if main scan of the page to be scanned is performed,
    wherein the preset condition is a condition that is set to determine the color components having great weight on the pre-scanned image as the candidate colors.

7. The image forming method as claimed in claim 6, wherein the displaying of the candidate colors comprises:
    detecting color components of pixels that constitute at least part of areas constituting the pre-scanned image;
    converting the detected color components into values on a preset color space;
    sampling plural color values of the pixels distributed in the color space, and classifying the sampled plural color values into plural groups through clustering of the sampled samples by distribution areas; and
    determining a priority of the dropout candidate colors using at least one of a center value, a distribution number, and an object number ratio of the respective classified groups.

8. An image forming apparatus, comprising:
    an image readout unit to pre-scan a page to be scanned;
    an image processing unit to analyze color components of the pre-scanned image with respect to a preset condition to determine candidate colors corresponding the preset condition from among the color components;
    a user interface unit to display the determined candidate colors and receive a user input to select a dropout color, among the displayed candidate colors; and
    a control unit operating to eliminate the selected dropout color from a main-scanned image if main scan of the page to be scanned is performed.

9. An image forming apparatus, comprising:
    an image readout unit to pre-scan a page to be scanned;
    an image processing unit to determine candidate colors that correspond to a preset condition, from among color components of the pre-scanned image, through analysis of the color components of the pre-scanned image;
    a user interface unit to display the determined candidate colors and select a dropout color, among the displayed candidate colors; and
    a control unit to operate to eliminate the selected dropout color from a main-scanned image if main scan of the page to be scanned is performed,
    wherein the preset condition is a condition that is set to determine the color components of lines of a form that constitutes the pre-scanned image as the candidate colors.

10. The image forming apparatus as claimed in claim 9, wherein the image processing unit searches for line components having a length that is equal to or larger than a preset length, among the respective components of the form that constitutes the pre-scanned image, detects color components of pixels that constitute the searched lines, and determines the detected color components as the candidate colors.

11. The image forming apparatus as claimed in claim 9, wherein the image processing unit comprises:
    a search unit searching for the lines having a length that is equal to or larger than a preset length among the respective components of the form that constitutes the pre-scanned image;
    a color space conversion unit detecting color components of pixels that constitute the searched lines and converting the detected color components into values on a preset color space;
    a classification unit sampling plural color values of the pixels distributed in the color space and classifying the sampled color values into plural groups through clustering of the sampled samples by distribution areas; and
    a priority determination unit determining a priority of the dropout candidate colors using at least one of a center value, a distribution number, and an object number ratio of the respective classified groups.

12. The image forming apparatus as claimed in claim 9, wherein the preset condition is a condition that is set to determine the color components having great weight on the pre-scanned image as the candidate colors.

13. The image forming apparatus as claimed in claim 9, wherein the image processing unit comprises:
    a color space conversion unit detecting color components of pixels that constitute at least part of areas constituting the pre-scanned image and converting the detected color components into values on a preset color space;
    a classification unit sampling plural color values of the pixels distributed in the color space and classifying the sampled plural color values into plural groups through clustering of the sampled samples by distribution areas; and
    a priority determination unit determining a priority of the dropout candidate colors using at least one of a center value, a distribution number, and an object number ratio of the respective classified groups.

14. The image forming apparatus as claimed in claim 9, wherein the user interface unit provides a preview function for the pre-scanned image from which the selected color has been eliminated.

15. A printing control terminal apparatus connected to an image forming apparatus, comprising:
- a communication interface unit to receive a pre-scanned image from the image forming apparatus;
- an image processing unit to analyze color components of the pre-scanned image with respect to a preset condition to determine candidate colors corresponding the preset condition from among the color components;
- a user interface unit to display the determined candidate colors and receive a user input to select a dropout color, among the displayed candidate colors; and
- a control unit to operate to eliminate the selected dropout color from a main-scanned image if main scan of the page to be scanned is performed.

16. A printing control terminal apparatus connected to an image forming apparatus, comprising:
- a communication interface unit to receive a pre-scanned image from the image forming apparatus;
- an image processing unit to determine candidate colors that correspond to a preset condition, from among color components of the pre-scanned image, through analysis of the color components of the pre-scanned image;
- a user interface unit to display the determined candidate colors and select a dropout color, among the displayed candidate colors; and
- a control unit to operate to eliminate the selected dropout color from a main-scanned image if main scan of the page to be scanned is performed, wherein the preset condition is a condition that is set to determine the color components of lines of a form that constitutes the pre-scanned image as the candidate colors.

17. A printing control terminal apparatus connected to an image forming apparatus, comprising:
- a communication interface unit to receive a pre-scanned image from the image forming apparatus;
- an image processing unit to determine candidate colors that correspond to a preset condition, from among color components of the pre-scanned image, through analysis of the color components of the pre-scanned image;
- a user interface unit to display the determined candidate colors and select a dropout color, among the displayed candidate colors; and
- a control unit to operate to eliminate the selected dropout color from a main-scanned image if main scan of the page to be scanned is performed,
- wherein the preset condition is a condition that is set to determine the color components having great weight on the pre-scanned image as the candidate colors.

18. A method of controlling a printing control terminal apparatus connected to an image forming apparatus, comprising:
- receiving, by a processor, a pre-scanned image from the image forming apparatus;
- analyzing color components of the pre-scanned image with respect to a preset condition to determine candidate colors corresponding the preset condition from among the color components;
- displaying the determined candidate colors;
- receiving a user input to select a dropout color among the displayed candidate colors; and
- eliminating the selected dropout color from a main-scanned image if main scan of the page to be scanned is performed.

19. A method of controlling a printing control terminal apparatus connected to an image forming apparatus, comprising:
- receiving, by a processor, a pre-scanned image from the image forming apparatus;
- displaying candidate colors that correspond to a preset condition, from among color components of the pre-scanned image, through analysis of the color components of the pre-scanned image;
- selecting a dropout color among the displayed candidate colors; and
- eliminating the selected dropout color from a main-scanned image if main scan of the page to be scanned is performed,
- wherein the preset condition is a condition that is set to determine the color components of lines of a form that constitutes the pre-scanned image as the candidate colors.

20. A method of controlling a printing control terminal apparatus connected to an image forming apparatus, comprising:
- receiving, by a processor, a pre-scanned image from the image forming apparatus;
- displaying candidate colors that correspond to a preset condition, from among color components of the pre-scanned image, through analysis of the color components of the pre-scanned image;
- selecting a dropout color among the displayed candidate colors; and
- eliminating the selected dropout color from a main-scanned image if main scan of the page to be scanned is performed,
- wherein the preset condition is a condition that is set to determine the color components having great weight on the pre-scanned image as the candidate colors.

* * * * *